United States Patent
Brosowske

(10) Patent No.: US 8,469,826 B2
(45) Date of Patent: Jun. 25, 2013

(54) RADIAL PISTON DAMPED TORSIONAL COUPLING AND MACHINE USING SAME

(75) Inventor: Thomas A. Brosowske, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/246,097

(22) Filed: Sep. 27, 2011

(65) Prior Publication Data

US 2013/0079159 A1    Mar. 28, 2013

(51) Int. Cl.
*F16D 3/80* (2006.01)
*F16D 31/02* (2006.01)

(52) U.S. Cl.
USPC .............................................. 464/27; 29/888

(58) Field of Classification Search
USPC ... 464/24, 27, 35, 37, 68.1, 68.3, 160; 29/888
See application file for complete search history.

(56) References Cited

U.S. PATENT DOCUMENTS

| | | | |
|---|---|---|---|
| 2,196,716 A | 4/1940 | Williams | |
| 2,633,216 A * | 3/1953 | Zak | 464/27 X |
| 4,464,822 A | 8/1984 | Pfeifer | |
| 4,485,906 A | 12/1984 | Lutz et al. | |
| 5,415,061 A | 5/1995 | Kohno | |
| 6,067,876 A | 5/2000 | Lohaus | |
| 6,382,050 B1 | 5/2002 | Carlson et al. | |
| 6,408,717 B1 | 6/2002 | Young et al. | |
| 7,335,107 B2 | 2/2008 | Brosowske | |
| 2010/0171248 A1 | 7/2010 | Geislinger et al. | |

* cited by examiner

*Primary Examiner* — Gregory Binda
*Assistant Examiner* — Josh Skroupa
(74) *Attorney, Agent, or Firm* — Liell & McNeil

(57) ABSTRACT

A damped torsional coupling is utilized to couple a drive shaft to a work shaft while permitting some relative rotation due to torsional vibrations. The coupling includes a second coupler oriented to rotate with respect to a first coupler about an axis through a continuum of negative to positive torque orientations. The first coupler defines a fluted perimeter surface with a number of flutes, distributed with radial symmetry about the axis. The second coupler a number of pistons reciprocally received in respective barrels to define a variable volume chamber fluidly connected to a damping passage. A spring biases the pistons and barrels to extend toward a position in contact with one of the flutes. The contact end may be an edge of a roller that rolls on the fluted perimeter surface in one of the flutes responsive to torques transmitted between the couplers.

20 Claims, 3 Drawing Sheets

US 8,469,826 B2

RADIAL PISTON DAMPED TORSIONAL COUPLING AND MACHINE USING SAME

TECHNICAL FIELD

The present disclosure relates generally to torsional couplings, and more particularly to a torsional coupling with radially oriented piston and barrel combinations for transmitting torques while damping torsional vibrations.

BACKGROUND

Torsional couplings are often encountered between two rotating components that need the ability to provide some relative rotation to accommodate torsional vibrations. For instance, an engine may be utilized to drive a hydraulic piston pump in a fracture rig pumping application. A torsional coupling may be necessary to accommodate torsional vibrations resulting from engine harmonic excitations due to sequential engine cylinder firings, and torsional vibrations may also originate from the pump with each pump stroke of each cylinder. In addition, natural torsional frequencies of various components in the drive line may also be excited and in need of being absorbed and damped.

Co-owned U.S. Pat. No. 7,335,107 teaches a torsional coupling in which torques are transmitted from a first coupling element to a second coupling element by way of an interaction between radially oriented pistons of the first coupling element that are biased into contact with circular arc surfaces on the second coupling element. Torsional vibrations are accommodated by the piston contact surface moving back and forth on the circular arc. This relative rotation between the first and second coupling elements results in movement of the piston into and out of its respective barrel. Some damping occurs due to the presence of lubricating fluid and friction at the piston contact with the second coupling element as well as with its respective barrel. While the '107 patent taught an innovative new type of torsional coupling, there remains room for improvement with respect to damping, wear and design variability to address the torsional demands of different applications.

The present disclosure is directed toward improvements to torsional couplings that utilize radially oriented piston and barrel combinations.

SUMMARY

In one aspect, a radial piston damped torsional coupling includes a second coupler oriented to rotate with respect to a first coupler about an axis through a continuum of negative, neutral and positive torque orientations. One of the first and second couplers defines a fluted perimeter surface with a number of flutes, which is at least three, distributed with radial symmetry about the axis. The other of the first and second couplers includes the number of pistons reciprocally received in respective barrels to define a variable volume chamber fluidly connected to a damping passage. A spring biases the pistons and barrels to extend toward a position where a contact end is in contact with one of the flutes. The contact end is an edge of a roller that rolls on the fluted perimeter surface in one of the flutes.

In another aspect, a machine includes an engine with a drive shaft, and a hydraulic piston pump with a pump shaft. The drive shaft is torsionally coupled to the pump shaft by a radial piston damped torsional coupling. A damping liquid source is fluidly connected to a variable volume chamber of the radial piston damped torsional coupling. The radial piston damped torsional coupling includes a first coupler linked to the drive shaft, a second coupler linked to the pump shaft, and one of the first coupler and second coupler includes a plurality of radially oriented pistons and barrel combinations with contact ends in contact with respective non-circular flutes on a fluted perimeter surface of an other of the first coupler and the second coupler. A torsional stiffness adjuster includes a damping liquid pressure regulator.

In still another aspect, a method of driving rotation of a work shaft about an axis includes applying a torque from a drive shaft to the work shaft through a radial piston damped torsional coupling. The step of applying a torque includes rotating a first coupler relative to a second coupler away from a neutral torque orientation. A roller of one of the first coupler and the second coupler rolls back and forth in a non-circular flute of a fluted perimeter surface of an other of the first coupler and the second coupler responsive to a torsional vibration. Relative rotation of the first coupler relative to the second coupler is damped by displacing damping liquid by moving a piston relative to a barrel along a radius line from the axis.

DETAILED DESCRIPTION

Figure 1:
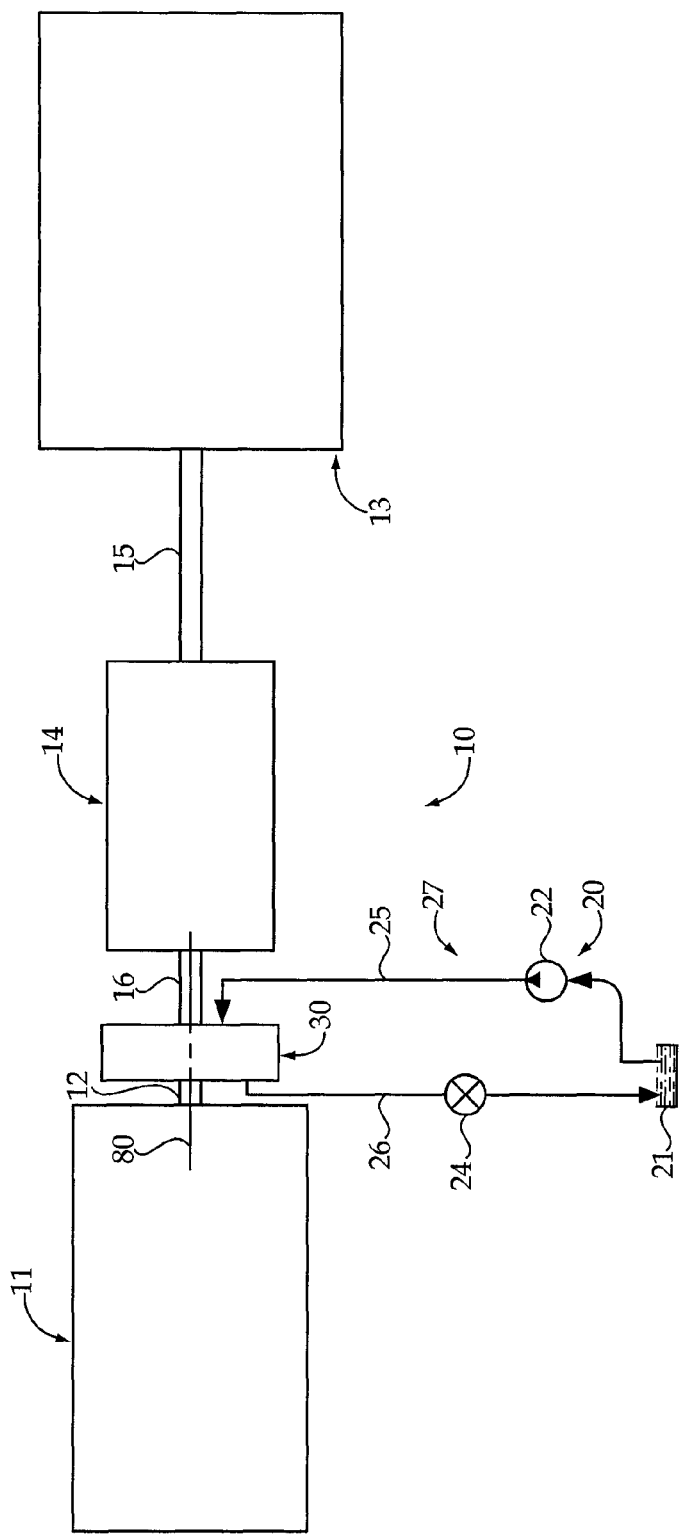
FIG. 1 is a schematic illustration of a machine according to one aspect of the present disclosure.

Referring to FIG. 1, a machine 10 according to one exemplary embodiment of the present disclosure is illustrated. Machine 10 may include an engine 11 with a drive shaft 12 operably coupled to drive rotation of a work shaft 15 of a driven component 13 by way of a radial piston damped torsional coupling 30 and a transmission/gear box 14. Driven equipment 13 could take on a wide variety of forms without departing from the present disclosure including a hydraulic piston pump in the event that machine 10 refers to a fracture rig pumping application, a propeller in the event that machine 10 were a marine application, an axle if machine 10 were a motor vehicle, etc. Torque from engine 11 is transmitted via drive shaft 12 through radial piston damped torsional coupling 30 to an output shaft 16. In turn, shaft 16 can also be thought of as an input shaft for transmission/gear box 14 to drive rotation of work shaft 15. In the example embodiment, machine 10 may be a fracture rig pump application, with driven equipment 15 being a hydraulic piston pump and work shaft 15 being a pump shaft. With or without transmission/gear box 14, drive shaft 12 may be thought of as being torsionally coupled to pump shaft 15 by radial piston damped torsional coupling 30.

Machine 10 also includes a torsional stiffness adjuster 20 that includes a source of damping liquid 21 fluidly connected to a pump 22, which supplies damping liquid to torsional coupling 30 via supply passage 25. A return passage 26 may include a valve 24. Depending upon the individual components, pump 22 and valve 24 may be considered a damping liquid pressure regulator 27 with the ability to set a desired pressure of damping liquid within torsional coupling 30.

Those skilled in the art will appreciate that although pump 22 and valve 24 are illustrated for regulating damping liquid pressure, many other known mechanisms and plumbing connections are known for controlling the pressure in a damping liquid. In the illustrated embodiment, the damping liquid might be lubricating oil or hydraulic fluid. In one variation, torsional coupling 30 could be configured in a way to be supplied with hydraulic transmission liquid from transmission 14, and have the supply being liquid pressure regulated in any manner known in the art without departing from the present disclosure.

Figure 2:
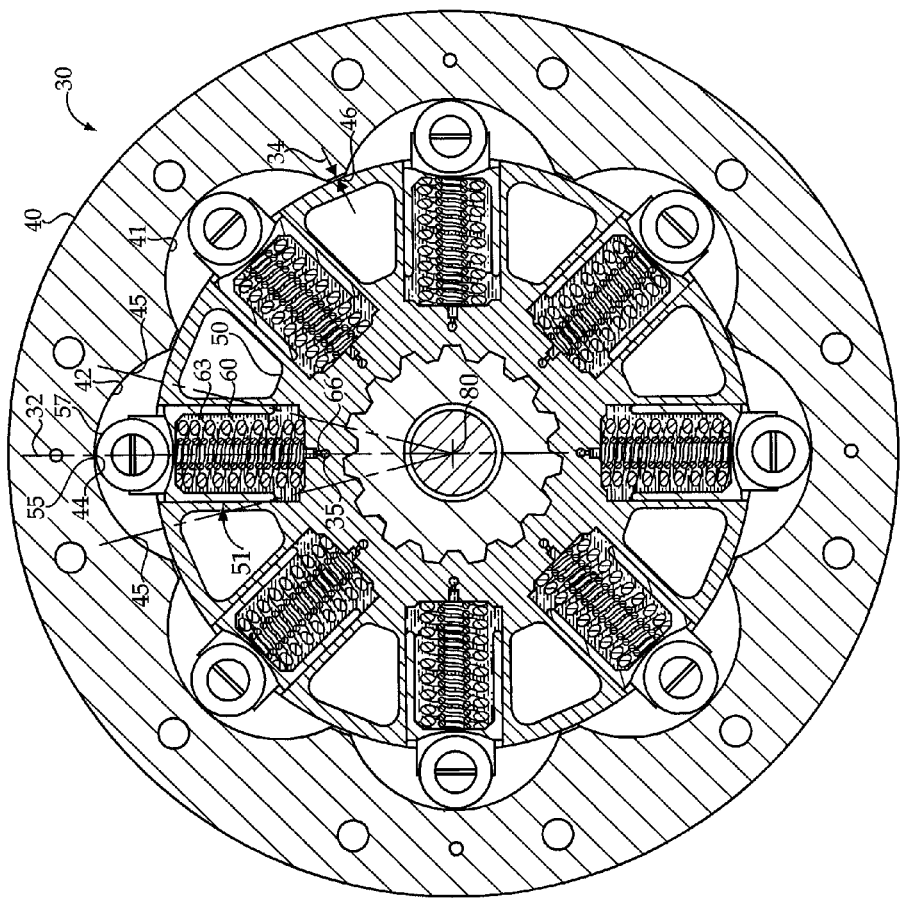
FIG. 2 is a partial front sectioned view of a radial piston damped torsional coupling according to another aspect of the present disclosure.
Figure 3:
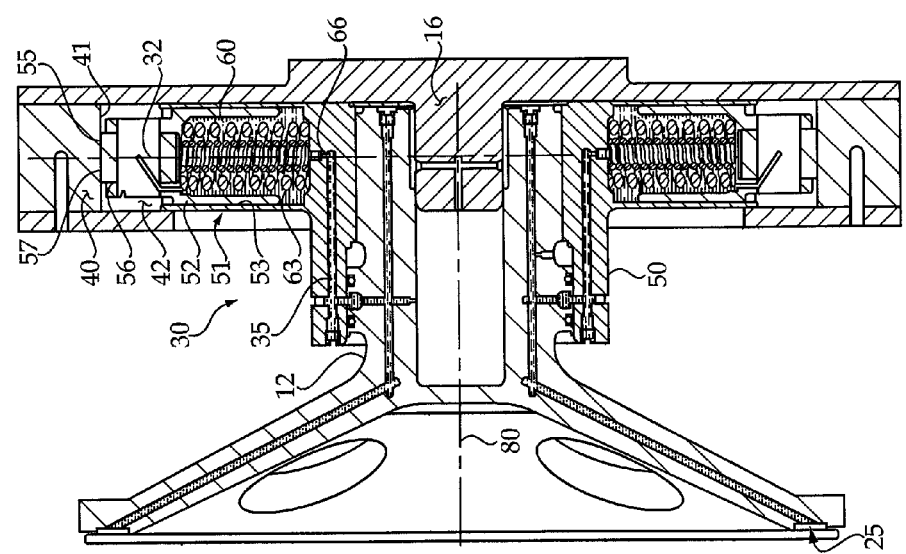
FIG. 3 is a side sectioned view of the radial piston damped torsional coupling of FIG. 2.

Referring now to FIGS. 2 and 3, radial piston damped torsional coupling 30 includes a first coupler 40 oriented to rotate with respect to a second coupler 50 about an axis 80 through a continuum of negative, neutral and positive torque orientations. In FIGS. 2 and 3, first and second couplers 40, 50 are shown in their neutral torque orientation. The first coupler 40 may be linked to drive shaft 12 of engine 11 in a conventional manner, such a via rim bolts to a fly wheel. The coupler 50 may be linked to pump shaft 15, such as via a spline and transmission 14. First coupler 40 defines an inwardly oriented fluted parameter surface 41 with a number of flutes 42 that are distributed with radial symmetry about axis 80. In all versions of the disclosure, the number of flutes is at least three, but the illustrated embodiment shows a version with eight flutes that are distributed with radial symmetry about axis 80, with each flute being separated by a radial stop 46. Second coupler 50 includes a number of piston and barrel combinations 51 equal to the number of flutes 42. In particular, second coupler 50 includes pistons 52 that are reciprocally received in respective barrels 53 to define a variable volume chamber 60 fluidly connected to a damping passage 35 via a damping orifice 66. Damping passage 35 may be fluidly connected to damping liquid supply passage 25, and damping orifice 66 may be sized to provide a desired amount of damping for damping liquid displaced therethrough responsive to movement of pistons 52 and barrels 53 to increase or decrease the volume of variable volume chamber 60. Thus, each variable volume chamber 60 may be filled with damping liquid originating from damping liquid source 21 (FIG. 1). In all versions of the present disclosure, each piston and barrel combination 51 maintains a constant fixed orientation with respect to a radius 32 from axis 80, with the radius 32 coinciding with the centerline of each respective piston and barrel combination 51.

One or more springs 63 may be positioned in variable volume chamber 60, or elsewhere, to bias the pistons and barrels to extend toward a position where a contact end 55 is in contact with one of the flutes 42. In the illustrated embodiment, the barrels 53 are fixed with regard to second coupler 50, and the pistons 52 are biased responsive to two coil springs 63 to maintain contact between contact end 55 and fluted perimeter surface 41. Nevertheless, those skilled in the art will appreciate that the pistons could be fixed and the barrels could be biased to move on fixed pistons without departing from the present disclosure. In other words, the rollers may be attached to moving components ("barrels") that are in sliding contact on their ID with fixed components ("pistons") in contact on their OD. The contact end 55 may be an edge 57 of a roller 56 that is attached to one end of each respective piston 52.

In the illustrated embodiment, each of the flutes 42 is symmetrical about a radius from axis 80, at a center 44 corresponding to an extended piston and barrel configuration, as shown. A pair of off center locations 45 correspond to a bottomed out piston and barrel configuration. Thus, FIGS. 2 and 3 show each piston and barrel combination 51 in their maximum extended position with contact end 55 in contact with flute 42 at center 44 of the respective flute, which corresponds to a neutral torque orientation. The off center points 45 identify the maximum angle of relative rotation permissible between first coupler 40 and second coupler 50 due to the fact that the pistons have bottomed out in their respective barrels 53, and may not retract any further. The off center points 45 correspond to respective expected maximum positive and negative design torques. Some applications may permit and even desire torques large enough to bottom out the piston and barrel combinations 51, whereas, other applications may be designed so that torques never, or almost never, result in the piston and barrel combinations reaching one or both of the off center points 45. The mathematically continuous surface of the flutes defines a continuum of positive, neutral and negative torques orientations between the first coupler 40 and the second coupler 50. Those skilled in the art will appreciate that the individual flutes need not necessarily be symmetric about a radius from axis 80. For instance, a majority of the flute surface may be located on one side or the other of a radius from axis 80 to reflect a machine in which the average working torque transmitted through torsional coupling 30 always is positive or negative, depending upon the particular application.

Although not necessary, each of the flutes 42 may follow a non-circular contour, such as an ellipse or maybe even a superellipse. Those skilled in the art will appreciate that the equation $(x/a)^n + (y/b)^n = 1$ represents a family of closed curves. When the exponent n is between zero and one, the superellipse that looks like a four-armed star with concave (inwardly curved) sides. When n is equal to 1, the curve becomes a diamond shape. When n is between one and two, the superellipse looks like a diamond with convex sides, and curvature that increases as one approaches the corners. When n is equal to 2, the curve is an ordinary ellipse, and becomes a circle if a=b. When n is greater than 2, the superellipse shape begins to look more like a rectangle with sharper corners. In the illustrated embodiment, superellipses with an exponent may be between 1.8 and 2 provide more torsional resistance (relative to a circle or ellipse) since the roller will almost immediately encounter a slope when moving off of the neutral torque orientation corresponding to center 44. Those skilled in the art will appreciate that a wide variety of different torque relationships may be obtained by choosing an appropriate contour for the individual flutes 42. As used in the present disclosure, and in reference to the above equation, a superellipse does not include a circle where a=b, nor does a superellipse correspond to a situation when the exponent n=2.

Due to the radially symmetric distribution of piston and barrel combinations 51, along with the respective spring biasing 63, the first coupler 40 and the second coupler 50 are biased toward concentricity with respect to axis 80. However, they may be off center displaceable to an eccentric distance 34 that is limited by a radial stop 46. In other words, the eccentric distance corresponds to a radial clearance between first coupler 40 and second coupler 50, and the limitation corresponds to the situation when second coupler 50 contacts one or more of the radial stops 46. Thus, the structure of the present disclosure does permit some misalignment between the respective shafts that are attached to the first and second couplers. This aspect of the disclosure also permits the two components (e.g., engine and pump) that are respectively linked to the first and second couplers 40, 50 some lateral movement, such as due to linear vibrations and the like without overstressing the coupling arrangement. In the illustrated embodiment, spring 63 is a pair of nested mechanical coil springs. However, those skilled in the art will appreciate that spring(s) 63 could be any type of suitable spring known in the art, such as a stack of bellville washers, a pneumatic spring, a single mechanical coil spring, or any combination there of without departing from the scope of the present disclosure.

Figure 4:
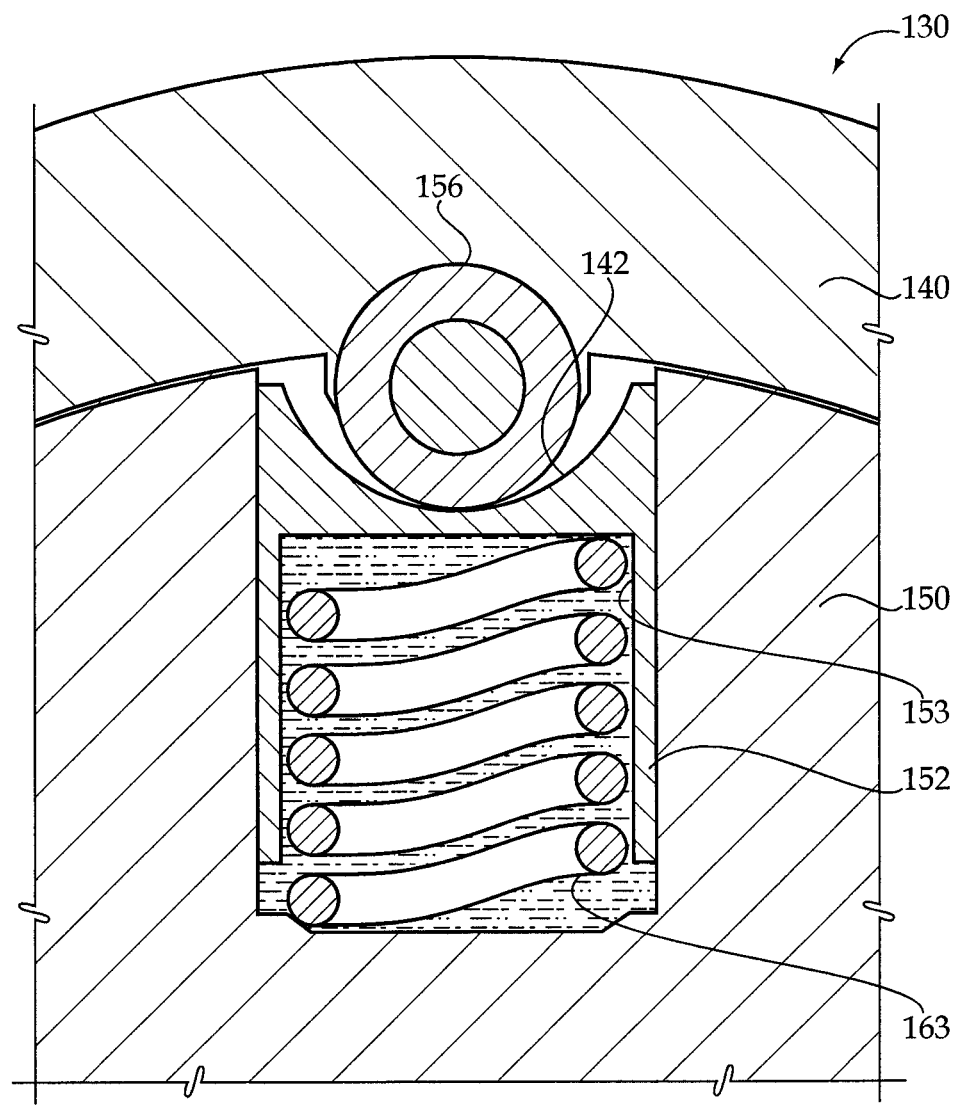
FIG. 4 is an enlarged side sectioned view of one piston and barrel portion of a radial piston damped torsional coupling according another embodiment of the present disclosure.

Although the torsional coupling 30 is illustrated with the fluted perimeter surface 41 being located on the outer component, namely first coupler 40, the fluted perimeter surface could instead be on the inner component and be an outwardly oriented fluted perimeter surface (resembling a Greek column) without departing from the present disclosure. In such a case, the piston and barrel combinations 51 would extend radially inward, instead of radially outward as in the illustrated embodiment. Referring to FIG. 4, an alternative structure for a radial piston damped torsional coupling 130 differs from the earlier embodiment by having rollers 156 mounted to a first coupler 140, while piston 152 and barrels 153 are part of a second coupling 150. Each of the pistons includes a flute 142. A spring 163 biases piston 152 and flute 142 into contact with roller 156. Flute 142 may follow the contour of a super ellipse.

Those skilled in the art will appreciate that engineers may design a variety of torsional coupling properties by adjusting the pressure of the damping liquid, by setting the preload on the biasing spring(s) 63, and also by taking into account the mass properties of the rotating components to account for torsional stiffness changes that may be attributable to the centrifugal force on the piston and barrel combinations 51 caused by rotational speed. In addition, the natural frequencies of machine 10 may also be adjusted by changing these parameters to change the torsional stiffness of coupling 30, which may inherently change in response to rotational speed. Other design considerations include the radius of rollers 56, the contour of the individual flutes 42, which would be irregular, as well as the number of piston and barrel combinations 51 and the associated number of flutes 42.

Industrial Applicability

The present disclosure finds potential application in any machine in which one rotating component drives rotation of a second rotating component. These two rotating components could be two shafts, as in the illustrated embodiment, a gear and a shaft, two gears, or any other similar structure known in the art without departing from the present disclosure. For instance, the outer surface of the outer coupler could include gear teeth for meshing with an adjacent gear that is driven to rotate by the outer coupler from a shaft linked to the inner coupler. In the illustrated embodiment, the drive and driven shafts are co-linear. The torsional coupling of the present disclosure finds particular application in heavy machinery, such as fracture rig applications, and maybe marine applications.

When in operation, a torque is applied from a drive shaft 12 to a work shaft 16 through the radial piston damped torsional coupling 30. When the torque is applied, the first coupler 40 rotates relative to the second coupler 50 away from neutral torque orientation, as shown. After settling in at a point on the fluted surface 41, a roller 56 of the second coupler 50 may roll back and forth in a non-circular flute 42 of a fluted perimeter surface 41 responsive to a torsional vibration. Thus, when the drive shaft is driving rotation of the work shaft with some average torque, the first coupler and second coupler will seek out a relative orientation that is stable at a specific point on the contour of the flute 42 corresponding to that average torque. When a torsional vibration is encountered, one could expect the first and second couplers to oscillate rotationally with respect to each other about that stable average torque point on the flute contour. This relative rotation may be damped by displacing damping liquid through orifice 66 into and out of variable volume chamber 60 responsive to the back and forth movement of the roller, and hence the in and out movement of the pistons 52 with regard to their respective barrels 53. The piston and barrel combinations 51 may bottom out at a maximum design torque position corresponding to off center locations 45 shown in FIG. 2. In general, the off center locations 45 may be designed beyond the expected maximum torque of a given machine application.

In some applications, the non-circular flute 42 may follow the contour of a superellipse as described earlier. In the illustrated embodiment, each of the flutes 42 occupies about 30-40% of an associated superellipse closed contour. The torsional stiffness of the radial piston damped torsional coupling 30 may be changed by changing a supply pressure of the liquid damping fluid. For instance, in the illustrated embodiment, the flow area through valve 24 could be adjusted to control the pressure of the damping liquid in torsional coupling 30 generally, and in the individual variable volume chambers 60 in particular. Those skilled in the art will appreciate that any known strategy for controlling pressure of the damping liquid in the variable volume chambers would fall within the scope of the present disclosure. Finally, an eccentric off center relationship between the drive shaft 12 and the work shaft 16 may be limited by radial stops 46.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A radial piston damped torsional coupling comprising:
a first coupler;
a second coupler oriented to rotate with respect to the first coupler about an axis through a continuum of negative, neutral and positive torque orientations;
one of the first and second couplers defining a fluted perimeter surface with a number of flutes, which is at least three, distributed with radial symmetry about the axis;
the other of the first and second couplers including the number of pistons reciprocally received in respective barrels to define a variable volume chamber fluidly connected to a damping passage;
a spring biasing the pistons and barrels to extend toward a position where a contact end is in contact with one of the flutes;
the contact end is an edge of a roller that rolls on the fluted perimeter surface in one of the flutes.

2. The damped torsional coupling of claim 1 wherein the variable volume chamber and damping passage are filled with a damping liquid.

3. The damped torsional coupling of claim 2 including a damping liquid pressure regulator.

4. The damped torsional coupling of claim 1 wherein each of the flutes has a shape that follows a contour of a superellipse.

5. The damped torsional coupling of claim 1 wherein each of the flutes is symmetrical about a radius from the axis, has a center corresponding to an extended piston and barrel configuration, and off-center locations corresponding to a bottomed out piston and barrel configuration.

6. The damped torsional coupling of claim 1 wherein the first and second couplers are biased toward concentricity, but are off-center displaceable to an eccentric distance limited by a radial stop.

7. The damped torsional coupling of claim 1 wherein the spring includes at least one mechanical spring in each of the variable volume chambers.

8. The damped torsional coupling of claim 7 wherein the variable volume chamber and damping passage are filled with a damping liquid; and including a damping liquid pressure regulator;

wherein each of the flutes has a shape that follows a contour of a superellipse and has a center corresponding to an extended piston and barrel configuration, and off-center locations corresponding to a bottomed out piston and barrel configuration;

wherein the first and second couplers are biased toward concentricity, but are off-center displaceable to an eccentric distance limited by a radial stop; and wherein the contact end is an edge of a roller that rolls on the fluted perimeter surface in one of the flutes.

9. A machine comprising:

an engine with a drive shaft;

a hydraulic piston pump with a pump shaft;

the drive shaft being torsionally coupled to the pump shaft by radial piston damped torsional coupling; and a damping liquid source fluidly connected to a radial variable volume chamber of the radial piston damped torsional coupling;

the radial piston damped torsional coupling including a first coupler attached to the drive shaft, a second coupler attached to the pump shaft, and one of the first coupler and second coupler including a plurality radially oriented pistons and barrels with contact ends in contact with respective non-circular flutes on a fluted perimeter surface of an other of the first coupler and second coupler; and a torsional stiffness adjustor that includes a damping liquid pressure regulator.

10. The machine of claim 9 wherein each of the non-circular flutes follows a contour of a superellipse.

11. The machine of claim 10 wherein the contact end of each of the pistons and barrels is an edge of a roller that rolls on the fluted perimeter surface in one of the non-circular flutes.

12. The machine of claim 9 wherein the contact end of each of the pistons and barrels is an edge of a roller that rolls on the fluted perimeter surface in one of the non-circular flutes.

13. The machine of claim 12 wherein the radial piston damped torsional coupling includes a plurality of springs that bias the first coupler and the second coupler toward concentricity.

14. The machine of claim 13 wherein each of the non-circular flutes is symmetrical about a radius from an axis of rotation, has a center corresponding to extended piston and barrel configuration, and off-center locations corresponding to a bottomed out piston and barrel configuration.

15. The machine of claim 9 wherein the first coupler is oriented to rotate with respect to the second coupler about an axis through a continuum of negative, neutral and positive torque orientations;

the first coupler defining the fluted perimeter surface with a majority being non-circular flutes distributed with radial symmetry about the axis;

the second coupler defining barrels that reciprocally receive pistons to define a variable volume chamber fluidly connected to the damping liquid source through an orifice defined by the second coupler; and a mechanical spring positioned in each variable volume chamber biasing one of the pistons toward a position where a roller end is in contact to roll back and forth in one of the non-circular flutes responsive to torques between the engine and the pump.

16. The machine of claim 15 wherein the first and second couplers are biased toward concentricity, but are off-center displaceable to an eccentric distance limited by a radial stop.

17. A method of driving rotation of a work shaft, comprising the steps of:

applying a torque from a drive shaft to the work shaft through a radial piston damped torsional coupling;

the applying step includes rotating a first coupler relative to a second coupler away from a neutral torque orientation;

rolling a roller of one of the first coupler and the second coupler back and forth in a non-circular flute that follow a contour of a superellipse of a fluted perimeter surface of an other of the first coupler and the second coupler responsive to a torsional vibration; and damping relative rotation of the first coupler relative to the second coupler by displacing damping liquid by moving a piston relative to a barrel.

18. The method of claim 17 including a step of bottoming out the piston in the barrel at a maximum torque position the non-circular flute.

19. The method of claim 18 adjusting a torsional stiffness of the radial piston damped torsional coupling by changing a supply pressure of a damping liquid.

20. The method of claim 19 including a step of limiting an eccentric off-center relationship between the drive shaft and the work shaft with a radial stop.

* * * * *